(No Model.)
A. A. TOWER.
BENCH DOG.
No. 418,771. Patented Jan. 7, 1890.
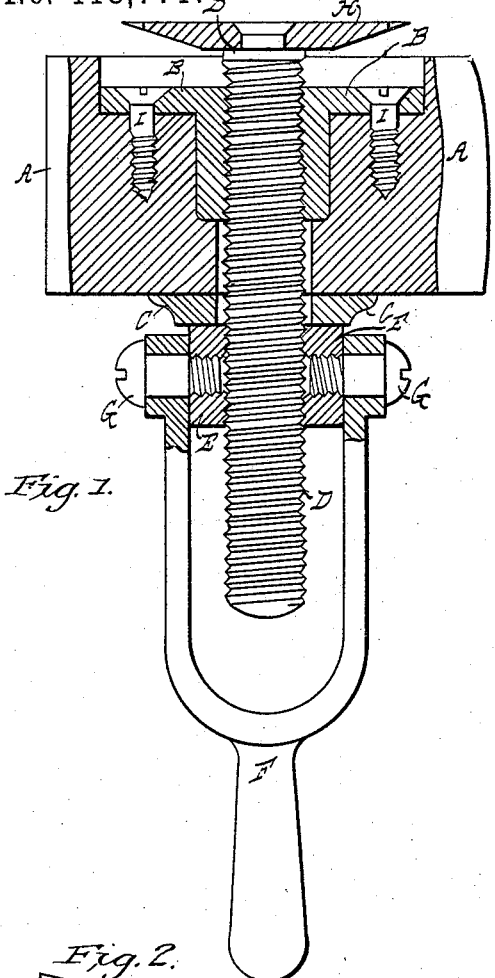
Fig. 1.
Fig. 2.
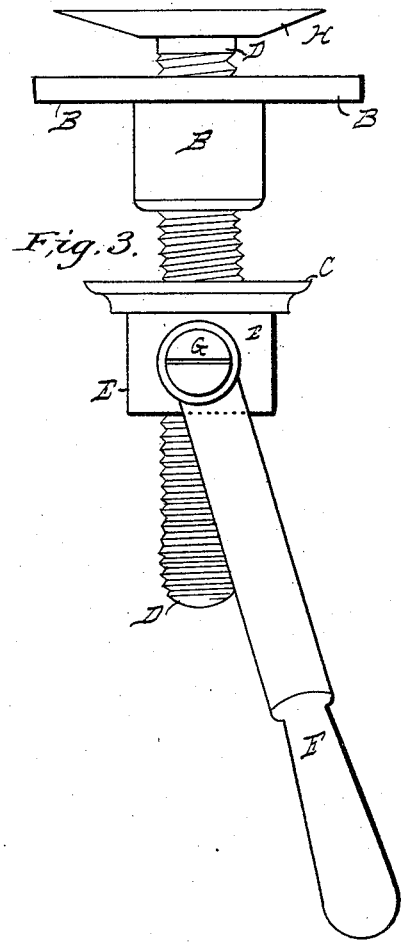
Fig. 3.
Witnesses
Marvin M. Sellers
Albert F. Sellers
Inventor
Adelbert A. Tower
By E. H. Sellers
his Attorney

UNITED STATES PATENT OFFICE.

ADELBERT A. TOWER, OF DETROIT, MICHIGAN.

BENCH-DOG.

SPECIFICATION forming part of Letters Patent No. 418,771, dated January 7, 1890.

Application filed April 13, 1889. Serial No. 307,167. (No model.)

*To all whom it may concern:*

Be it known that I, ADELBERT A. TOWER, of the city of Detroit, in the county of Wayne and State of Michigan, have invented a new and useful Improvement in Bench-Dogs, of which the following is a specification.

My invention relates to improvements in bench-dogs; and the object of my improvements is to provide a bench-dog of simple construction, which shall be readily adjustable at different heights from the bench. I attain this object in the device illustrated in the accompanying drawings, in which—

Figure 1 is an elevation, partially in section, of the bench-dog attached to a bench. Fig. 2 is plan view of the same, and Fig. 3 is an elevation of the bench-dog detached from the bench.

Similar letters refer to similar parts throughout the several views.

A is a portion of the bench-top.

B is a flanged nut countersunk into the bench-top, leaving a sufficient distance between the top of said nut and the upper surface of the bench-top to allow the dog to fall until its upper surface is on a level with or below the upper surface of the bench-top. The nut B may be secured in place by screws I I.

D is a screw-threaded bolt passing through the nut B, the screw-threads upon said bolt engaging with the female screw-threads upon the nut B.

H is the dog proper, secured to the top of the bolt D.

C is a washer passing around the bolt D between the bench and the jam-nut E.

E is a nut upon the bolt D.

F is a handle, pivoted at the upper ends of its forks to the nut E. The forks, forming part of the handle F, should be sufficiently long to allow the lower end of said handle to pass below the lower end of the bolt D when said handle is oscillated about its pivots upon the nut E.

The operation of my bench-dog is as follows: The nut E is loosened by screwing it down upon the bolt D by means of the handle F. The dog proper H is adjusted to the required distance above the bench-top by turning the bolt D by means of said dog proper. The nut E is forced firmly against the washer C by turning said nut around the bolt D by means of the handle F. The friction of the parts will then prevent any accidental displacement of the dog H. The object of the washer C is to present a large surface to the bench A to prevent the crushing of the material of said bench.

The handle may be oscillated about the pivots on the nut E to the most convenient position to form a lever for turning said nut.

Having fully described my invention, what I claim, and wish to secure by Letters Patent, is—

The combination of a nut countersunk into a bench-top, a screw-threaded bolt passing through and engaging with said nut, a dog proper H, secured to the top of said bolt, a jam-nut upon said screw-threaded bolt below the bench-top, and a handle pivoted to said jam-nut, substantially as shown and described.

ADELBERT A. TOWER.

Witnesses:
MARIAN M. SELLERS,
ALBERT F. SELLERS.